US010648203B2

(12) United States Patent
Gerardiere et al.

(10) Patent No.: US 10,648,203 B2
(45) Date of Patent: May 12, 2020

(54) METHOD OF DETECTING A USER'S INTENTION TO LOCK OR UNLOCK AN AUTOMOTIVE VEHICLE DOOR AND ASSOCIATED DETECTION DEVICE

(71) Applicants: Continental Automotive France, Toulouse (FR); Continental Automotive GmbH, Hannover (DE)

(72) Inventors: Olivier Gerardiere, Tournefeuille (FR); Sébastien Kessler, Dremil-Lafage (FR); Grégory Siguier, Miremont (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/339,138

(22) PCT Filed: Nov. 16, 2017

(86) PCT No.: PCT/FR2017/053137
§ 371 (c)(1),
(2) Date: Apr. 3, 2019

(87) PCT Pub. No.: WO2018/091829
PCT Pub. Date: May 24, 2018

(65) Prior Publication Data
US 2020/0040619 A1 Feb. 6, 2020

(30) Foreign Application Priority Data
Nov. 17, 2016 (FR) .................................. 16 61132

(51) Int. Cl.
H04B 7/00 (2006.01)
E05B 81/78 (2014.01)
(Continued)

(52) U.S. Cl.
CPC ............ *E05B 81/78* (2013.01); *H01Q 1/3241* (2013.01); *H04B 17/318* (2015.01); *H04W 4/80* (2018.02);
(Continued)

(58) Field of Classification Search
CPC ...... H04W 4/80; H04W 4/48; H04W 52/0235; E05Y 2400/856; E05Y 2201/43;
(Continued)

(56) References Cited

U.S. PATENT DOCUMENTS 9,919,680 B2 * 3/2018 Miyazawa ............... B60R 25/24
10,124,763 B2 * 11/2018 Miyazawa ............... B60R 25/24
(Continued)

FOREIGN PATENT DOCUMENTS

FR 3013069 A1 5/2015

OTHER PUBLICATIONS

English Translation of the Written Opinion for International Application No. PCT/FR2017/053137, dated Feb. 9, 2018—7 pages.
(Continued)

Primary Examiner — Nhan T Le
(74) Attorney, Agent, or Firm — RatnerPrestia

(57) ABSTRACT

A method for detecting a user's intention to lock or to unlock a door of a motor vehicle, using a detection device integrated into a handle of the door, including an ultra-high-frequency antenna, one face of which is situated close to a second outer locking surface or respectively a first outer unlocking surface of the handle, an ultra-high-frequency antenna matching circuit, an ultra-high-frequency signal generator and an electronic unit. The method includes determining a parameter representative of a ratio between a power of a signal transmitted by the ultra-high-frequency signal generator to the ultra-high-frequency antenna and a power of a signal reflected from the ultra-high-frequency antenna to the ultra-
(Continued)

high-frequency signal generator, which powers are measured beforehand, and detecting the intention to lock or respectively to unlock when the parameter is higher than or lower than a predetermined threshold.

11 Claims, 3 Drawing Sheets

(51) Int. Cl.
    *H04B 17/318*    (2015.01)
    *H04W 4/80*     (2018.01)
    *H01Q 1/32*     (2006.01)

(52) U.S. Cl.
    CPC ... *E05Y 2400/856* (2013.01); *E05Y 2900/531* (2013.01)

(58) Field of Classification Search
    CPC ........... E05Y 2400/616; E05Y 2400/66; E05Y 2400/664; E05Y 2900/531; H04B 1/3822; H04B 17/318; E05B 81/78; H01Q 1/3241
See application file for complete search history.

(56) References Cited

U.S. PATENT DOCUMENTS

| | | | |
|---|---|---|---|
| 10,183,650 B2* | 1/2019 | Verkin | B60R 25/24 |
| 10,438,430 B2* | 10/2019 | Hayashi | G07C 9/00309 |
| 2011/0181509 A1 | 7/2011 | Rautiainen et al. | |
| 2015/0049054 A1 | 2/2015 | Wakabayashi et al. | |
| 2019/0219678 A1* | 7/2019 | Miyazawa | H04B 17/318 |

OTHER PUBLICATIONS

International Search Report and Written Opinion for International Application No. PCT/FR2017/053137, dated Feb. 9, 2018—10 pages.

* cited by examiner

METHOD OF DETECTING A USER'S INTENTION TO LOCK OR UNLOCK AN AUTOMOTIVE VEHICLE DOOR AND ASSOCIATED DETECTION DEVICE

CROSS REFERENCE TO RELATED APPLICATIONS

This application is the U.S. National Phase Application of PCT International Application No. PCT/FR2017/053137, filed Nov. 16, 2017, which claims priority to French Patent Application No. 1661132, filed Nov. 17, 2016, the contents of such applications being incorporated by reference herein.

FIELD OF THE INVENTION

The invention relates to a method for detecting a user's intention to lock or to unlock a motor vehicle door and to an associated detection device.

BACKGROUND OF THE INVENTION

Nowadays, vehicle door handles are equipped with devices for detecting a user's intention to lock or to unlock a vehicle door. Detecting a user's intention to lock/unlock, coupled with the recognition of an identifier contained in a "hands-free" access device, for example a remote-control access "hands-free" electronic fob, or a mobile telephone, carried by this user, makes it possible to remotely lock and unlock opening elements of the vehicle. Thus, when the user, carrying the electronic fob or the corresponding telephone identified by the vehicle, wishes to unlock the vehicle, he approaches the handle or touches the door handle of the vehicle, and the opening elements of the vehicle are then automatically unlocked. By approaching or by pressing on a precise location of the door handle of the vehicle, called "unlocking zone", the door (or alternatively all of the opening elements) is (are) unlocked without any other action from the user. Conversely, when the user, still carrying the necessary fob identified by the vehicle, wishes to lock his vehicle, he closes the door of his vehicle and he approaches or momentarily presses on another precise location of the handle, called "locking zone". This movement makes it possible to lock the opening elements of the vehicle automatically.

These detection devices generally comprise two capacitive sensors, in the form of two electrodes connected electrically to a printed circuit and integrated into the door handle, each in a precise locking or unlocking zone. Generally, one electrode is dedicated to each zone, that is to say one electrode is dedicated to detecting the approach and/or the contact of the user's hand in the locking zone and one electrode is dedicated to detecting the approach and/or the contact of the user's hand in the unlocking zone.

The locking/unlocking detection device furthermore comprises a radiofrequency antenna for exchanging an identifier between the vehicle and the hands-free access fob or the telephone.

This antenna may be of low-frequency (LF) type, for example at 125 kHz.

If the portable device is a mobile telephone, radiofrequency and LF communication with the vehicle is not always possible, since most mobile telephones do not have any RF, or LF, communication means whose frequencies are compatible with those used during communication with a vehicle, such as the frequencies of 315 MHz and 433.92 MHz for RF and 125 kHz for LF.

However, mobile telephones now employ the Bluetooth® or Bluetooth Low Energy "BLE" communication standard, that is to say communication at ultra-high frequency (UHF) from 2.4 GHz to 2.48 GHz. This communication standard exhibits the advantage of being universal and therefore does not require any accreditation specific to each country (only a Bluetooth Low Energy international certification), as is the case with the current RF and LF communication standards whose operating frequency differs according to country.

It therefore becomes necessary to adapt the "hands-free" access and/or starting system to a vehicle so that it is also able to operate with a mobile telephone equipped with the Bluetooth® communication standard and no longer solely by way of radio waves and low-frequency waves (RF, LF).

The advantage of the Bluetooth® communication standard or of Bluetooth Low Energy BLE is that it allows a large communication range of about 100 m around the vehicle for BLE.

Bluetooth® communication therefore exhibits numerous advantages with respect to low frequency.

The detection device is connected to the vehicle's electronic computer (ECU: abbreviation for "electronic control unit") and sends it a presence detection signal. The electronic computer of the vehicle has, beforehand, identified the user as being authorized to access this vehicle, or alternatively, following the reception of this presence detection signal, it performs this identification.

As explained above, when the "hands-free" access device is a mobile telephone, the identifier is exchanged through Bluetooth® communication.

If the electronic computer recognizes the identification code as the one authorizing access to the vehicle, it triggers the locking/unlocking of the door (or of all of the opening elements). If, on the other hand, the electronic computer has not received any identification code or if the received identification code is erroneous, locking or unlocking is not performed.

Such vehicles are therefore equipped with door handles comprising a detection device, itself comprising a high-frequency or ultra-high-frequency (HF or UHF) antenna A, and two electrodes connected to a microcontroller, integrated into a printed circuit and supplied with a voltage.

Purely for the sake of explanation, consideration will be given here to a detection device D comprising two capacitive sensors in the form of two electrodes, one electrode dedicated to the unlocking zone and one electrode dedicated to the locking zone, said two electrodes being connected to a printed circuit comprising a microcontroller, and a Bluetooth® antenna A. A detection device D from the prior art is described with reference to FIG. 1.

FIG. 1 shows a motor vehicle door P handle 100 (vehicle not shown) in which there is situated a device D for detecting the presence of a user. Said door P handle 100 comprises a first outer surface S1 oriented in the direction of the door P and a second outer surface S2, opposite the first outer surface S1 and therefore oriented on the side opposite the vehicle, more precisely toward the user (not shown). This detection device D comprises a first unlocking electrode E2, one face of which is situated close to the first outer surface S1, and control means 60 and a UHF antenna A, one face of which is situated close to the second outer surface S2, a second locking electrode E1, one face of which is situated close to, the second outer surface S2, and control means 60. The first and the second electrode E1, E2 are connected to the control means 60. These control means 60 measure the capacitance between the terminal of each first and second electrode E1, E2 and ground, formed by the hand of the approaching user, so as to detect the presence (the approach and/or the contact) of a user in the detection zones, that is to say in a locking zone Z1 or in an unlocking zone Z2, and consist for example of a microcontroller 60 integrated into a printed circuit 80. The high-frequency antenna A is for its part connected to an electronic computer on board the vehicle (not shown) of BCM ("body controller module") type, which manages the identification requests transmitted by said ultra-high-frequency antenna A.

When the user's hand M approaches the electrode E1 or E2, the user acts as a second electrode, connected to ground, which increases the capacitance of the detection capacitance to a capacitance higher than the nominal capacitance of the detection capacitance "at rest" (that is to say in the absence of a user).

The move in the capacitance above a threshold confirms the detection of the approach of the user's hand.

However, this detection device D from the prior art exhibits major drawbacks.

Specifically, the detection of the approach of a user using capacitive sensors (first and second electrode E1 and E2) is not robust and generates false detections.

In particular, in some environmental conditions, when the ambient air is humid or when there is salt on the roads, capacitive coupling is created between the detection zones (locking zone Z1 and unlocking zone Z2) and the metal parts of the vehicle, thereby preventing any detection of the presence of a user using the capacitive sensors.

In addition, raindrops or snowflakes on the door handle increase the capacitance measured by the capacitive sensors, thus triggering false detections.

Other drawbacks stem from the cost incurred by the device (the two electrodes are made of copper) and by the space necessary inside the handle in order to house the detection device therein.

SUMMARY OF THE INVENTION

An aspect of the invention therefore proposes a method and a device for detecting a user's intention to lock or unlock the door of a vehicle that does not require capacitive sensors and that thus makes it possible to reduce the cost and the size of the detection device and that also overcomes false detections that are inherent to the detection device using capacitive sensors.

An aspect of the invention proposes a method for detecting a user's intention to lock or to unlock a door of a motor vehicle, using a detection device integrated into a handle of said door, comprising an ultra-high-frequency antenna for exchanging an identifier with a "hands-free" access device carried by the user, one face of which is situated close to a second outer locking surface or respectively a first outer unlocking surface of the handle, an ultra-high-frequency antenna matching circuit, an ultra-high-frequency signal generator and an electronic unit, said method being characterized by:

measuring a power of the signal transmitted by the ultra-high-frequency signal generator to the ultra-high-frequency antenna and a power of the signal reflected from the ultra-high-frequency antenna to the ultra-high-frequency signal generator, determining a parameter representative of a ratio between the power of the transmitted signal and the power of the reflected signal, comparing the parameter with a predetermined threshold, detecting the intention to lock or respectively to unlock when the parameter is higher than or lower than the predetermined threshold.

Advantageously, the parameter is determined at regular intervals.

Expediently, the parameter is a coefficient of reflection or a standing wave ratio, and the locking and unlocking detection is performed when the coefficient of reflection or the standing wave ratio is higher than the predetermined threshold.

An aspect of the invention also relates to a device for detecting intention to lock or to unlock a door of a motor vehicle, integrated into a handle of said door and comprising an ultra-high-frequency antenna for exchanging an identifier with a "hands-free" access device carried by the user, one face of which is situated close to a second outer locking surface or a first outer unlocking surface of the handle, an ultra-high-frequency antenna matching circuit, an ultra-high-frequency signal generator and an electronic unit, said device being noteworthy in that it furthermore comprises:

means for measuring a power of the signal transmitted by the ultra-high-frequency signal generator to the ultra-high-frequency antenna and a power of the signal reflected from the ultra-high-frequency antenna to the ultra-high-frequency signal generator, which means are electrically connected firstly to the ultra-high-frequency antenna and to the ultra-high-frequency antenna matching circuit and electrically connected secondly to the ultra-high-frequency signal generator, means for calculating a parameter representative of a ratio between the power of the signal transmitted by the ultra-high-frequency signal generator to the ultra-high-frequency antenna and the power of the signal reflected from the ultra-high-frequency antenna to the ultra-high-frequency signal generator, means for comparing between the parameter and a predetermined threshold so as to detect the intention to lock or respectively to unlock the door.

The measurement means preferably consist of a bidirectional coupler.

Advantageously, the calculating means and the comparison means consist of software means integrated into a calculating unit of microprocessor type.

Preferably, the frequency of the ultra-high-frequency antenna is higher than or equal to 100 MHz and the antenna may be a Bluetooth® antenna whose frequency is between 2.40 GHz and 2.48 GHz.

An aspect of the invention also relates to a vehicle door handle, comprising a detection device according to any one of the features listed above.

An aspect of the invention applies to any motor vehicle, comprising a detection device according to any one of the features listed above.

BRIEF DESCRIPTION OF THE DRAWINGS

Other aims, features and advantages of aspects of the invention will become apparent on reading the following description, by way of nonlimiting example, and on examining the appended drawings, in which.

DETAILED DESCRIPTION OF THE PREFERRED EMBODIMENTS

Figure 1:
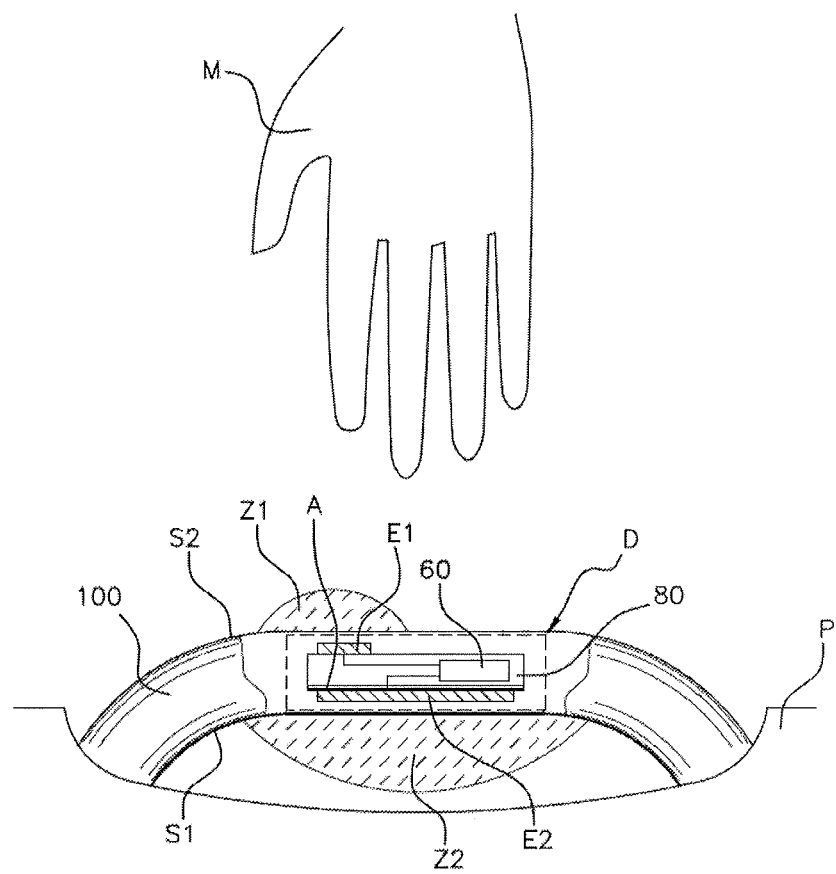
FIG. 1 schematically shows the detection device D from the prior art, integrated into a motor vehicle door P handle 100, FIG. 2 schematically shows the detection device D' according to an aspect of the invention, FIG. 3 schematically shows the detection device D', integrated into a motor vehicle door P handle 100', according to an aspect of the invention.

As explained above, FIG. 1 shows the detection device D from the prior art, comprising a locking electrode E1 and an unlocking electrode E2.

The drawbacks of such a detection device D are:
the lack of reliability of the detection performed by the capacitive presence sensors, using the two locking and unlocking electrodes E1, E2,
the cost of the capacitive sensors,
the bulk in the handle generated by the capacitive sensors, specifically by the locking and unlocking electrodes E1, E2.

An aspect of the invention proposes to rectify this problem. An aspect of the invention proposes to detect the presence of the user's hand close to the handle, and therefore to detect the intention to lock or to unlock the door, while dispensing with capacitive sensors.

More precisely, an aspect of the invention proposes a method for detecting intention to lock or to unlock the door using the ultra-high-frequency antenna A, present in the handle 100, which makes it possible to communicate and more particularly to exchange an identifier with a "hands-free" access device carried by the user.

Specifically, the applicant has observed that the presence of the user's hand close to the handle 100 in which the ultra-high-frequency antenna A is present disturbs the field of electromagnetic waves coming from the ultra-high-frequency antenna A.

Figure 2:
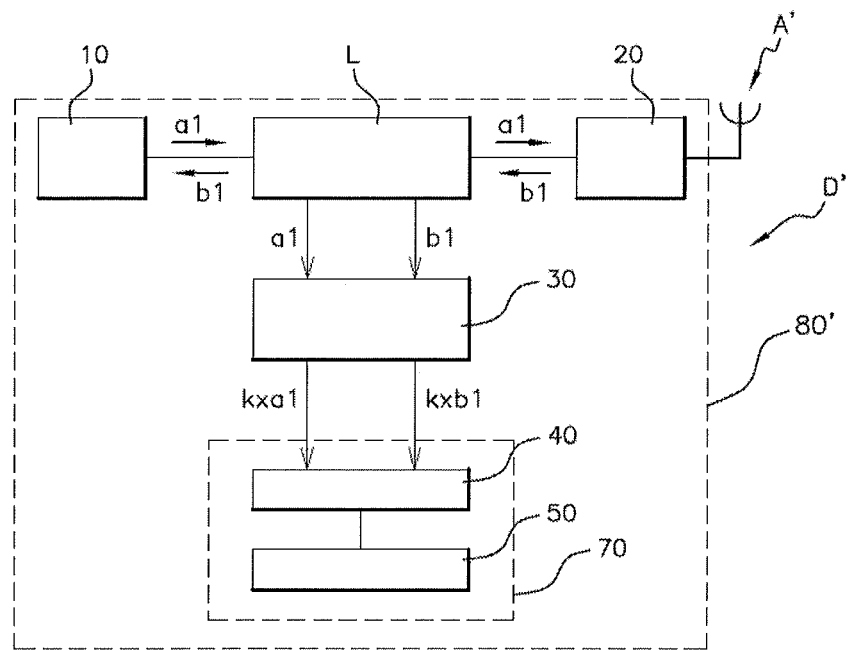
Figure 3:
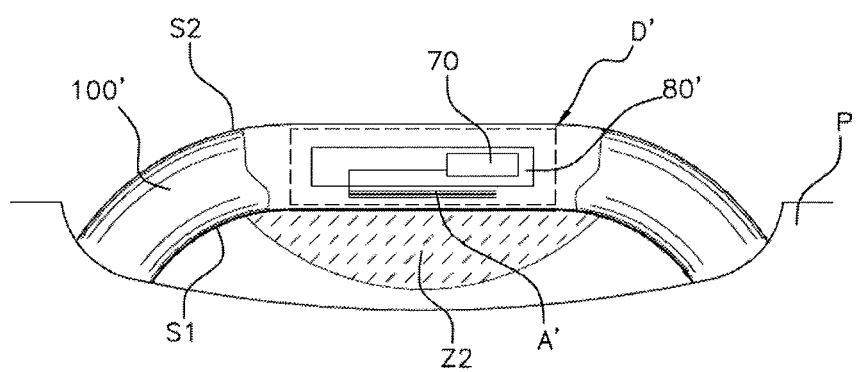

The detection device D' according to an aspect of the invention, as illustrated in FIG. 2, and integrated into a handle 100', comprises:
an ultra-high-frequency antenna A', one face of which is situated close to a second outer locking surface S2 or a first outer unlocking surface S1 of the handle 100, connected to
an ultra-high-frequency antenna matching circuit 20, generally a circuit of capacitors and impedances, which is itself connected to
an ultra-high-frequency signal generator 10 and
control means, more precisely an electronic control unit 70.

The ultra-high-frequency antenna A' in our example is a Bluetooth® antenna, but this is in no way limiting and an aspect of the invention also applies to any high-frequency antenna whose transmission frequency is equal to or higher than 100 MHz.

"Ultra-high-frequency" will therefore be the name given to any frequency higher than 100 MHz, including a Bluetooth® antenna.

The ultra-high-frequency antenna A' according to an aspect of the invention is a "wire" antenna, also called a "whip" antenna, more precisely an IFA ("inverted F antenna") or MIFA ("meandered inverted F antenna") antenna.

The ultra-high-frequency antenna A' is preferably situated close to one of the two outer surfaces (S1, S2) of the handle 100' that constitute the contact surfaces for the user's hand in order to respectively unlock or lock the door P of the vehicle and therefore the surfaces for detecting the approach of the user. The ultra-high-frequency antenna A' according to an aspect of the invention is positioned in the handle 100', such that one of these faces is situated either close to the second outer surface S2, so as to detect the approach of the hand close to said second outer surface S2 and to detect the intention to lock the door P, or close to the first outer surface S1, so as to detect the approach of the hand close to the first outer surface S1 and to detect the intention to unlock the door P.

The ultra-high-frequency antenna A' is not situated equidistantly between the first outer surface S1 and the second outer surface S2.

According to an aspect of the invention, the detection device D' furthermore comprises:
means 30 for measuring a power of the signal a1 transmitted by the ultra-high-frequency signal generator 10 to the ultra-high-frequency antenna A' and a power of the signal b1 reflected from the ultra-high-frequency antenna A' to the ultra-high-frequency signal generator 10, which means are electrically connected firstly to the ultra-high-frequency antenna A' and to the matching circuit 20 and electrically connected secondly to the ultra-high-frequency signal generator 10,
means 40 for calculating a parameter representative of a ratio between the power of the signal a1 transmitted by the ultra-high-frequency signal generator 10 to the ultra-high-frequency antenna A' and the power of the signal b1 reflected from the ultra-high-frequency antenna A' to the ultra-high-frequency signal generator 10,
means 50 for comparing between said parameter and a predetermined threshold so as to lock or unlock the door.

The ultra-high-frequency antenna A' is connected to the matching circuit 20, which is itself connected, via a transmission line L, to the ultra-high-frequency signal generator 10.

The measurement means 30 consist for example of a bidirectional coupler, connected to the transmission line L.

The bidirectional coupler thus measures:
the power of the signal a1 transmitted by the ultra-high-frequency signal generator 10 to the ultra-high-frequency antenna A',
the power of the signal b1 reflected and received by the ultra-high-frequency signal generator 10 from the ultra-high-frequency antenna A'.

The calculating means 40 and the comparison means 50 consist of software means integrated into a calculating unit of microprocessor 70 type.

The ultra-high-frequency antenna A' is connected to a printed circuit 80' that furthermore comprises the matching circuit 20, the transmission line L, the ultra-high-frequency signal generator 10, the measurement means 30, the calculating means 40, and the comparison means 50, as illustrated in FIG. 2.

The calculating means 40 receive, from the measurement means 30, an item of information containing the value of the power of the transmitted signal a1 and an item of information containing the value of the power of the reflected signal b1 and determine a ratio between the power of the signal a1 transmitted by the ultra-high-frequency signal generator 10 to the ultra-high-frequency antenna A' and the power of the signal b1 reflected from the ultra-high-frequency antenna A' to the ultra-high-frequency signal generator 10. More precisely, the calculating means 40 determine the ratio ρ, called "coefficient, of reflection", defined by:

$$\rho = \frac{vr}{ve} \cong \sqrt{\frac{b1}{a1}}$$

where:
Ve: is the amplitude of the voltage of the transmitted wave (V),
Vr: is the amplitude of the voltage of the reflected wave (V),
b1: is the reflected power (W),
a1: is the transmitted power (W).

Or alternatively, the calculating means 40 determine the "SWR" ratio, called standing wave ratio, defined by $$SWR = \frac{Vmax}{Vmin}$$

where:

$$V\min = Ve - Vr$$

and $$V\max = Ve + Vr$$

That is to say also:

$$SWR = \frac{1+\rho}{1-\rho} = \frac{1+\sqrt{\frac{b1}{a1}}}{1-\sqrt{\frac{b1}{a1}}}$$

V min: is the minimum voltage amplitude of the standing wave (V) (i.e.: the transmitted wave and the reflected wave bring about destructive interference),
V max: is the maximum voltage amplitude of the standing wave (V) (i.e.: the transmitted wave and the reflected wave bring about constructive interference),
Ve: is the voltage amplitude of the transmitted wave (V),
Vr: is the voltage amplitude of the reflected wave (V),
b1: is the power of the reflected signal (W),
a1: is the power of the transmitted signal (W).

The applicant has observed that the standing wave ratio, SWR, or the coefficient of reflection ρ of the ultra-high-frequency antenna A' varied strongly upon the approach of a hand close to the ultra-high-frequency antenna A' situated in the handle 100'.

Figure 4:
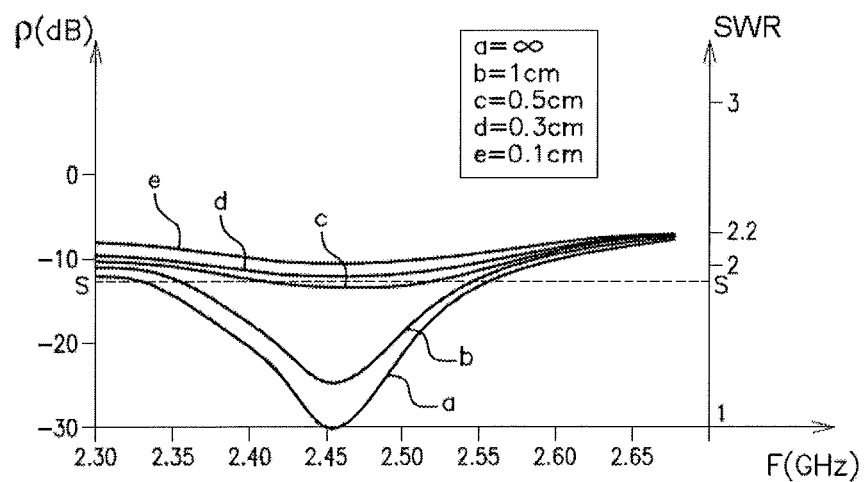
FIG. 4 is a graph illustrating the variation of the coefficient of reflection p and of the standing wave ratio SWR as a function of the frequency F of the ultra-high-frequency antenna A', for several values of distances a, b, c, d and e between the user's hand and the ultra-high-frequency antenna A' situated in the door P handle 100' of the vehicle, according to an aspect of the invention.

This is illustrated in FIG. 4.

FIG. 4 shows the variation of the coefficient of reflection ρ and the variation of the standing wave ratio SWR as a function of the frequency F of the ultra-high-frequency antenna A' for various distances a, b, c, d and e between the user's hand and the ultra-high-frequency antenna A' situated in the handle 100'.

The curve "a" shows the case in which the user's hand is absent, and there is therefore no hand close to the handle 100'.

The curve "b" shows the case in which the user's hand is situated 1 cm away from the high-frequency antenna A'.

The curve "c" shows the case in which the user's hand is situated 0.5 cm away from the high-frequency antenna A'.

The curve "d" shows the case in which the user's hand is situated 0.3 cm away from the high-frequency antenna A'.

The curve "e" shows the case in which the user's hand is situated 0.1 cm away from the high-frequency antenna A'.

In the absence of a hand close to the ultra-high-frequency antenna A', illustrated by the curve "a", the values of the coefficient of reflection ρ and the values of the standing wave ratio are greatly degraded and reduced within the Bluetooth® frequency band, that is to say between 2.35 GHz and 2.55 GHz. Said values drop from a respective nominal value of −10 dB, and 2.2 at the frequencies situated below 2.35 GHz and above 2.55 GHz, to a minimum value of −30 dB or 1 at the Bluetooth frequency, that is to say 2.4 GHz.

When the user's hand touches the first outer surface S1, illustrated by the curve "e", the values of the coefficient of reflection ρ and of the standing wave ratio SWR are no longer degraded, and increase, for frequencies between 2.35 GHz and 2.55 GHz, to their nominal values of −10 dB and 2.2.

Therefore, any increase in the value of the coefficient of reflection ρ or of the SWR above a predetermined threshold S, for example equal to −12 dB or 1.9 in the transmission frequency window of the ultra-high-frequency antenna A', that is to say between 2.40 GHz and 2.48 GHz, indicates the presence of the hand close to the high-frequency antenna A', and the detection of intention to lock or unlock. If the ultra-high-frequency antenna is situated close to the first surface S1, any increase in the value of the coefficient of reflection ρ or of the SWR above a predetermined threshold S makes it possible to detect intention to unlock.

Similarly, if the ultra-high-frequency antenna is situated close to the second surface S2, any increase in the value of the coefficient of reflection ρ or of the SWR above a predetermined threshold S makes it possible to detect intention to lock.

The detection method according to an aspect of the invention will now be described.

The detection method according to an aspect of the invention makes it possible to detect the presence of the hand either close to the second outer surface S2 or respectively close to the first outer surface S1 of the handle 100', and therefore the intention to lock or respectively to unlock the door P of the vehicle.

For this purpose, according to the method of an aspect of the invention, the ultra-high-frequency antenna A' is positioned close to the outer surface for which it is desired to detect the approach of the user's hand, either S1 or S2.

Purely for the sake of illustration, the ultra-high-frequency antenna A' in this example is positioned close to the first outer surface S1, so as to detect the presence of the user's hand close to the first outer surface S1, that is to say in the unlocking zone Z2, and therefore so as to detect the user's intention to unlock the door P.

In a first step Et1 (cf. FIG. 5), the measurement means 30 measure the value of the power of the signal a1 transmitted and the value of the power of the signal b1 reflected between the signal generator 10 and the ultra-high-frequency antenna A'.

Then, in a second step Et2 (cf. FIG. 5), the calculating means 40 determine a parameter representative of the ratio between the power of the signal a1 transmitted by the ultra-high-frequency signal generator to the ultra-high-frequency antenna A' and the power of the signal b1 reflected from the ultra-high-frequency antenna A' to the ultra-high-frequency signal generator. This parameter may be the coefficient of reflection ρ or the standing wave ratio SWR, such as defined above.

In a third step Et3 (cf. FIG. 5), the comparison means 50 compare the value of the parameter, ρ or SWR or any other parameter calculated from the ratio between the power of the transmitted signal a1 and the power of the reflected signal b1, with a predetermined threshold S. The detection of intention to unlock, step Et4, is performed when the parameter is higher than a predetermined threshold S (cf. FIG. 4) in the transmission frequency window of the ultra-high-frequency antenna A', in this example the transmission frequency between 2.4 GHz and 2.48 GHz, which corresponds to the Bluetooth® frequency band.

Figure 5:
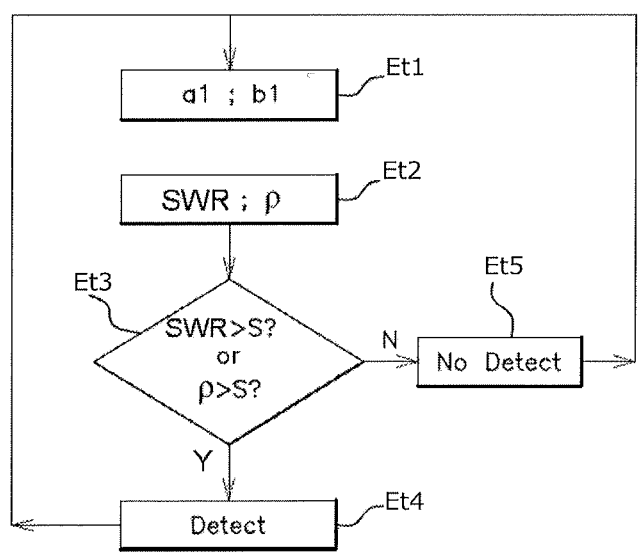
FIG. 5 is a flow chart showing the detection method according to an aspect of the invention.

As illustrated in FIG. 4, when the parameter is the coefficient of reflection ρ or the standing wave ratio SWR, detection of the presence of the hand is performed, cf. step Et4 "detect" in FIG. 5, if ρ or SWR moves above a predetermined threshold S. If the coefficient of reflection or the standing wave ratio is lower than the predetermined threshold S, then the detection of intention to unlock is not confirmed, cf. step Et5 "no detect" in FIG. 5.

Once the detection has or has not been confirmed (steps Et4 or Et5), the method resumes at step Et1.

The detection method according to an aspect of the invention therefore comprises the following steps:
measuring (step Et1) the power of the signal a1 transmitted by the ultra-high-frequency signal generator 10 to the ultra-high-frequency antenna A' and the power of the signal b1 reflected from the ultra-high-frequency antenna A' to the ultra-high-frequency signal generator 10,
determining (step Et2) a parameter (SWR, ρ) representative of a ratio between the power of the transmitted signal a1 and the power of the reflected signal b1,
comparing (step Et3) the parameter (SWR, ρ) with a predetermined threshold S,
detecting the intention to lock or to unlock (step Et4) when the parameter (SWR, ρ) is higher than or lower than the predetermined threshold.

It should be noted that the detection is only able to be performed in the transmission frequency band of the ultra-high-frequency antenna A'.

The ultra-high-frequency antenna A' transmits in a transmission frequency band in this example of between 2.4 GHz and 2.48 GHz, and the detection is confirmed only if the parameter, in this case SWR or ρ, is higher than the predetermined threshold S, in the transmission frequency band of the ultra-high-frequency antenna A'.

It should also be noted that the reciprocal of SWR or of ρ may be used as parameters, and in this case the reciprocal values of SWR or of ρ moving below a predetermined threshold then confirms the approach detection.

In one preferred embodiment of an aspect of the invention, the detection is performed at regular intervals. More precisely, steps Et1 and Et2 are repeated at a predetermined frequency, for example every millisecond, or around every ten milliseconds, depending on the desired detection sensitivity.

It should be noted that the detection does not affect the operation of the ultra-high-frequency antenna A'. In other words, the ultra-high-frequency antenna A' is able to communicate with the "hands-free" access device using Bluetooth® throughout an approach detection.

Of course, the approach detection may only be performed when the ultra-high-frequency antenna A' is active, that is to say when it is transmitting an electromagnetic field, for example when transmitting a "hands-free" device identifier request around the vehicle.

An aspect of the invention therefore makes it possible to detect the intention to lock or to unlock the door while dispensing with capacitive sensors, by expediently using the modification of the electromagnetic field transmitted by the ultra-high-frequency antenna A', caused by the presence of a hand in said field.

By calculating a parameter representative of this electromagnetic field modification, specifically the standing wave ratio or the coefficient of reflection, it is then possible to detect the presence of the hand close to the ultra-high-frequency antenna A' and therefore the presence of the hand in the locking or unlocking zones.

Depending on the position of the ultra-high-frequency antenna A' in the handle, close to the locking surface or close to the unlocking surface, the modification of the electromagnetic field transmitted by the ultra-high-frequency antenna, due to the presence of the hand, indicates the intention to lock or respectively to unlock the door.

It should be noted that the detection method does not work with low-frequency antennas, of LF type, as the disturbance of the electromagnetic field by the user's hand is imperceptible.

Aspects of the invention are therefore ingenious insofar as it allows a considerable reduction in cost and bulk and a reduction in false detections that are inherent to capacitive sensors.

The invention claimed is:

1. A method for detecting a user's intention to lock or to unlock a door of a motor vehicle, using a detection device integrated into a handle of said door, comprising an ultra high-frequency antenna for exchanging an identifier with a "hands-free" access device carried by the user, one face of which is situated close to a second outer surface or respectively a first outer surface of the handle, an ultra-high-frequency antenna matching circuit, an ultra-high-frequency signal generator and an electronic unit, said method comprising:
measuring a power of a signal transmitted by the ultra-high-frequency signal generator to the ultra-high-frequency antenna and a power of a signal reflected from the ultra-high-frequency antenna to the ultra-high-frequency signal generator,
determining a parameter representative of a ratio between the power of the transmitted signal and the power of the reflected signal,
comparing the parameter with a predetermined threshold, and
detecting the intention to lock or respectively to unlock when the parameter is higher than or lower than the predetermined threshold.

2. The detection method as claimed in claim 1, wherein the parameter is determined at regular intervals.

3. The detection method as claimed in claim 2, wherein the parameter is a coefficient of reflection or a standing wave ratio, and the locking or respectively unlocking detection is performed when the coefficient of reflection or the standing wave ratio is higher than the predetermined threshold.

4. The detection method as claimed in claim 1, wherein the parameter is a coefficient of reflection or a standing wave ratio, and the locking or respectively unlocking detection is performed when the coefficient of reflection or the standing wave ratio is higher than the predetermined threshold.

5. A device for detecting intention to lock or to unlock a door of a motor vehicle, integrated into a handle of said door and comprising:
    an ultra-high-frequency antenna for exchanging an identifier with a "hands-free" access device carried by the user, one face of which is situated close to a second outer surface or respectively a first outer surface of the handle,
    an ultra-high-frequency antenna matching circuit,
    an ultra-high-frequency signal generator, and
    an electronic unit, comprising:
        means for measuring a power of a signal transmitted by the ultra-high-frequency signal generator to the ultra-high-frequency antenna and a power of a signal reflected from the ultra-high-frequency antenna to the ultra-high-frequency signal generator, which means are electrically connected firstly to the ultra-high-frequency antenna and to the ultra-high-frequency antenna matching circuit and electrically connected secondly to the ultra-high-frequency signal generator,
        means for calculating a parameter representative of a ratio between the power of the signal transmitted by the ultra-high-frequency signal generator to the ultra-high-frequency antenna and the power of the signal reflected from the ultra-high-frequency antenna to the ultra-high-frequency signal generator, and
        means for comparing between the parameter and a predetermined threshold so as to detect the intention to lock or respectively to unlock the door.

6. The detection device as claimed in claim 5, wherein the measurement means comprises a bidirectional coupler.

7. The detection device as claimed in claim 5, wherein the calculating means and the comparison means are comprised of software means integrated into a microprocessor based calculating unit.

8. The detection device as claimed in claim 5, wherein the frequency of the ultra-high-frequency antenna is higher than or equal to 100 MHz.

9. The detection device as claimed in claim 5, wherein the ultra-high-frequency antenna is a Bluetooth® antenna whose frequency is between 2.40 GHz and 2.48 GHz.

10. A vehicle door handle, comprising a detection device as claimed in claim 5.

11. A motor vehicle, comprising a detection device as claimed in claim 5.

* * * * *